A. A. RUSTEBERG.
HYDROCARBON HEATING UNIT.
APPLICATION FILED OCT. 26, 1918.
1,322,350.
Patented Nov. 18, 1919.
3 SHEETS—SHEET 1.
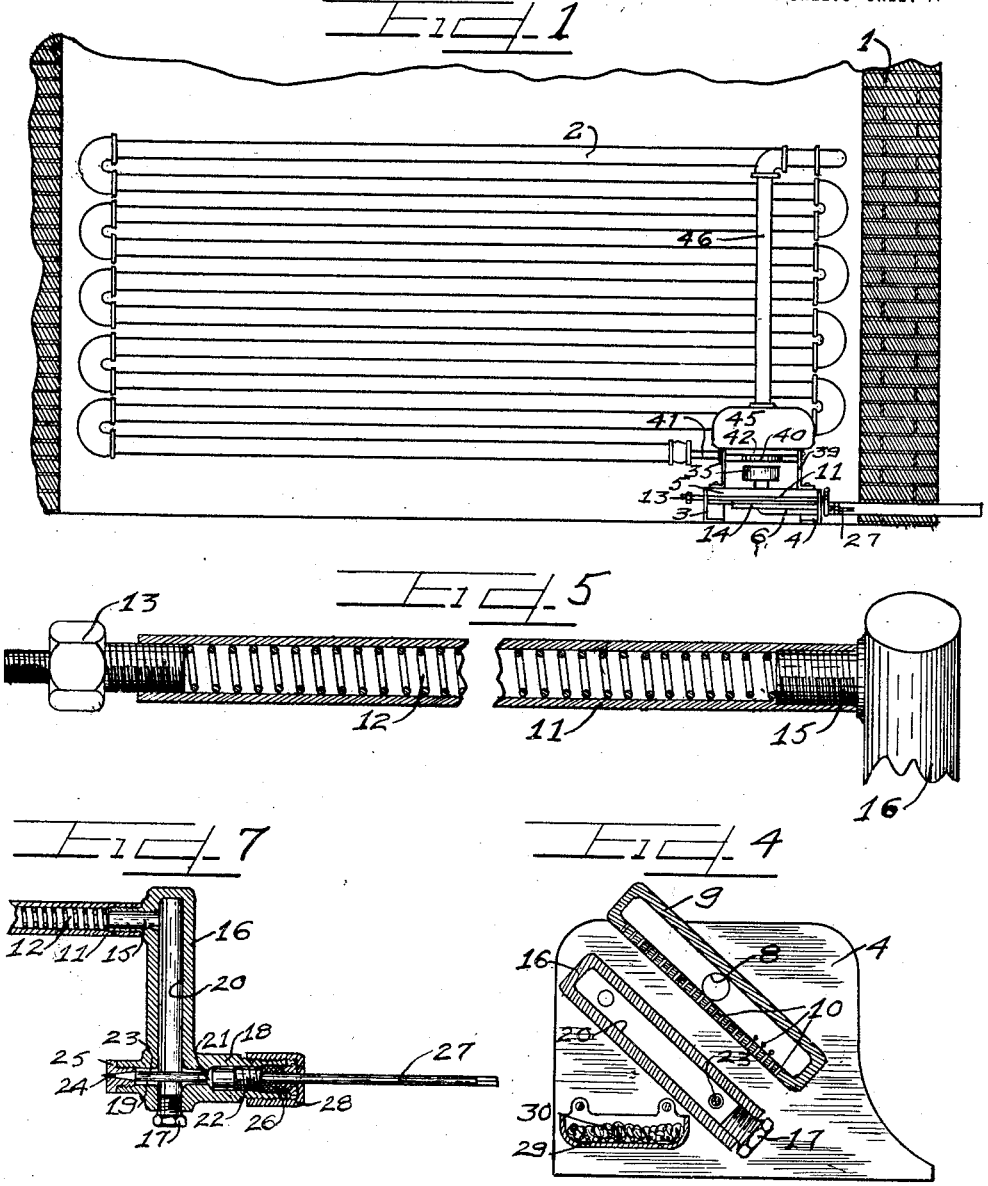

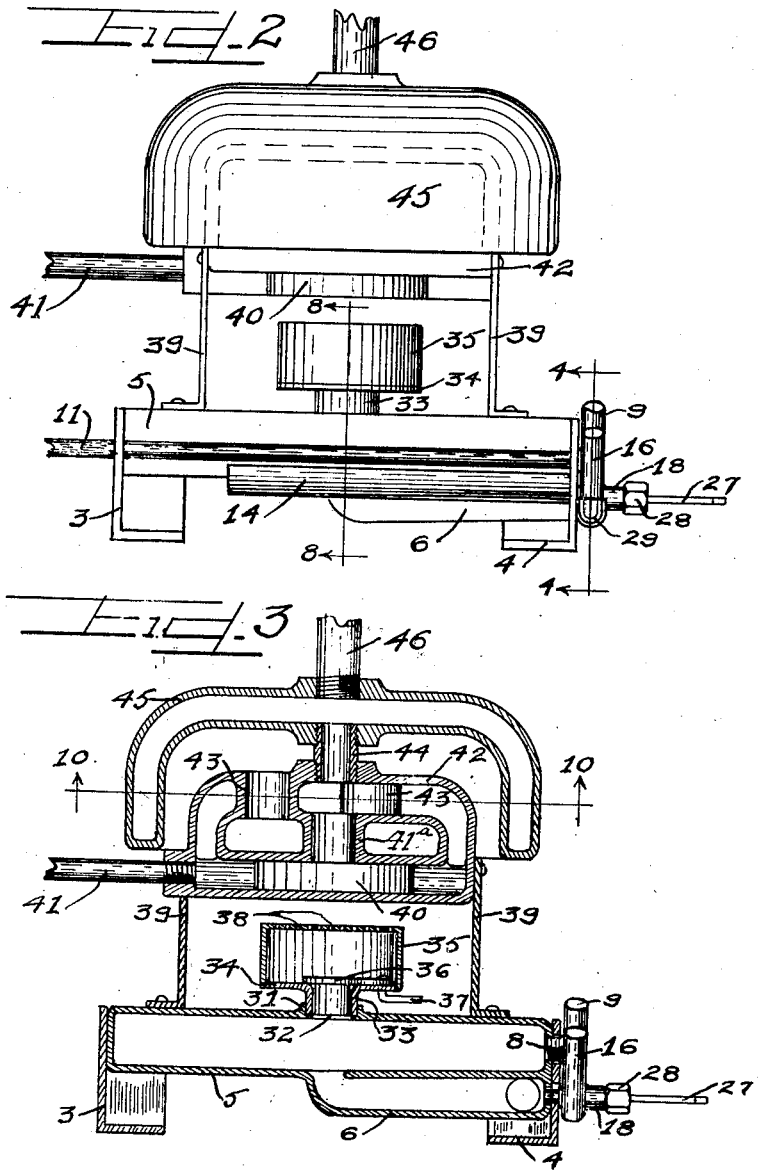

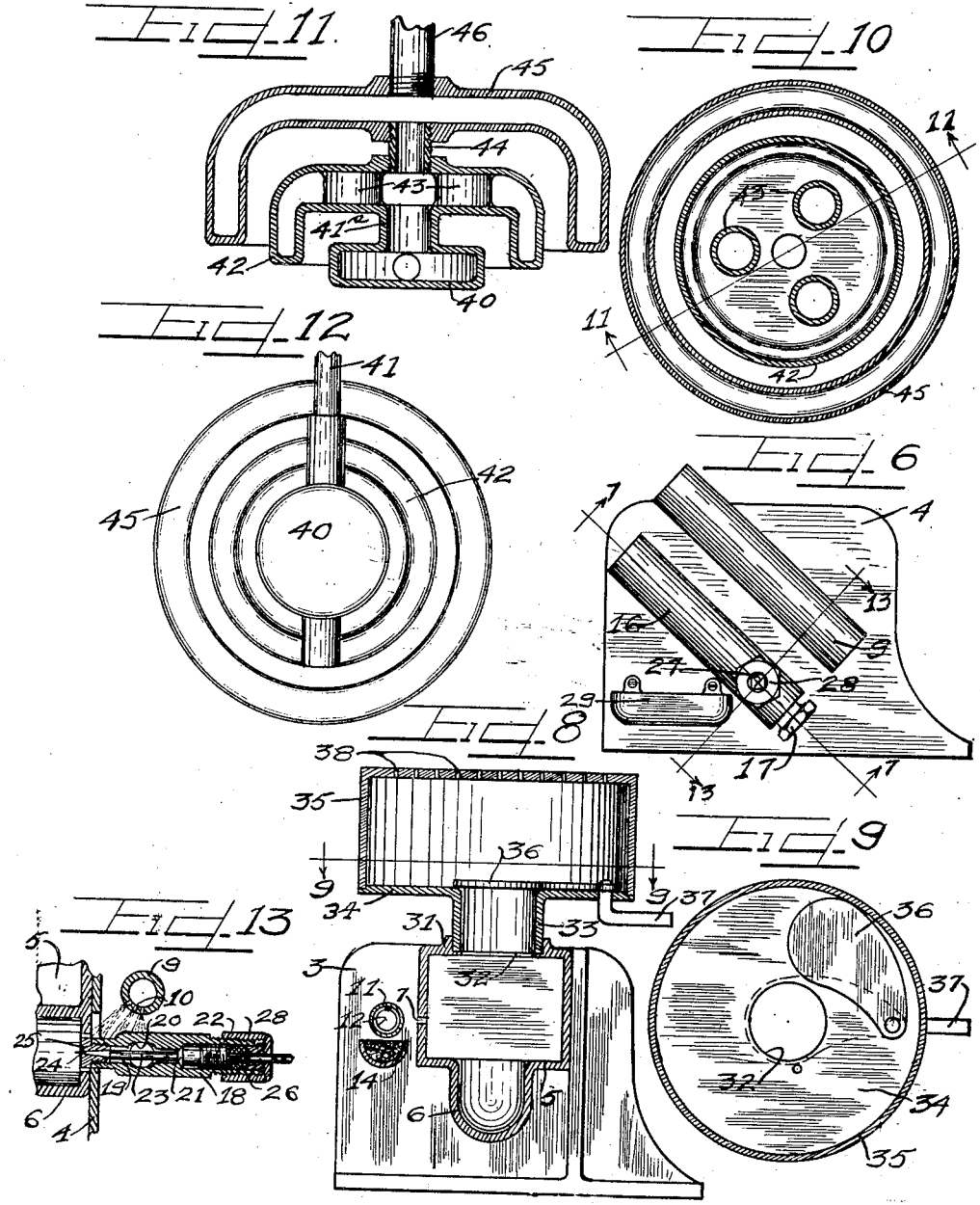

UNITED STATES PATENT OFFICE.

AUGUST A. RUSTEBERG, OF CHICAGO, ILLINOIS, ASSIGNOR, BY MESNE ASSIGNMENTS, TO THE CHAMPION KEROSENE-BURNER COMPANY, OF KENTON, OHIO, A CORPORATION OF OHIO.

HYDROCARBON HEATING UNIT.

1,322,350.   Specification of Letters Patent.   Patented Nov. 18, 1919.

Application filed October 26, 1918. Serial No. 259,855.

*To all whom it may concern:*

Be it known that I, AUGUST A. RUSTEBERG, a citizen of the United States, and a resident of the city of Chicago, in the county of Cook and State of Illinois, have invented certain new and useful Improvements in Hydrocarbon Heating Units; and I do hereby declare that the following is a full, clear, and exact description of the same, reference being had to the accompanying drawings, and to the numerals of reference marked thereon, which form a part of this specification.

This invention pertains to an improved type of a hydro-carbon heating unit of simple and effective construction adaptable for use in connection with radiators, water tanks and other similar devices; said heating unit being formed to generate its own gas which is burned to heat water circulated through a chambered hood disposed over the burner of the heating unit to receive heat therefrom.

It is an object of this invention to construct a water heating unit which generates its own oil-gas to be used as a fuel for heating water and as a fuel for continuing the process of oil-gas generation.

It is also an object of this invention to provide a self-generating oil-gas burner having a chambered hood disposed thereover to receive heat therefrom for the purpose of heating water circulating through said hood.

It is a further object of the invention to construct a fuel gas generating device wherein a plurality of oil volatilizing mechanisms are used to generate an oil-gas adapted to be burned as a fuel to heat water circulating through a plurality of superimposed intercommunicating hoods.

It is furthermore an object of this invention to produce a water heating unit wherein water circulating through a plurality of intercommunicating hoods is heated by a hydro-carbon burner which is disposed below said hoods and is adapted to generate its own fuel gas, after the burner has been started by means of starting burners forming a part thereof.

It is an important object of this invention to construct a heating unit wherein water is heated by means of heat received from very hot flames caused by the burning of an oil-gas issuing from and generated in a hydro-carbon device which is adapted to volatilize an oil to generate the oil-gas.

Other and further important objects of this invention will be apparent from the disclosures in the specification and drawings.

The invention (in a preferred form) is illustrated in the drawings and hereinafter more fully described.

On the drawings:

Figure 1 is an elevational view of a hot water radiator having a device attached thereto for heating the water circulating therethrough, said device embodying the principles of this invention.

Fig. 2 is an enlarged elevational view of the device.

Fig. 3 is a longitudinal vertical section taken therethrough with parts in elevation.

Fig. 4 is an enlarged section taken on line 4—4 of Fig. 2.

Fig. 5 is an enlarged longitudinal section taken through the main generating tube, showing parts in elevation.

Fig. 6 is an end view of the gas generation portion of the device.

Fig. 7 is a section on line 7—7 of Fig. 6.

Fig. 8 is an enlarged section taken on line 8—8 of Fig. 2.

Fig. 9 is a detail section on line 9—9 of Fig. 8.

Fig. 10 is a section taken on line 10—10 of Fig. 3.

Fig. 11 is a section on line 11—11 of Fig. 10.

Fig. 12 is a bottom plan view of the hood.

Fig. 13 is a detail section taken on line 13—13 of Fig. 6, with parts broken away and parts in elevation.

As shown on the drawings:

The reference numeral 1, indicates the walls of a room having a hot water radiator 2, positioned therein embracing a series of communicating pipes as shown in Fig. 1. The hydro-carbon heating unit embodying the principles of this invention is shown connected with the radiator 2, and comprises end frames, supports or standards 3, and 4, spaced opposite to one another and have rigidly secured therebetween a gas storage tank or primary gas reservoir 5, having integrally formed or rigidly secured to the bottom thereof a fuel mixing or carbureting pipe 6, one end of which communicates with the interior of the storage tank 5, and the other end of which is provided with an opening and is disposed opposite the inner surface of the end frame 4, with the opening therein registering with an opening in said end frame. The front wall of the storage tank 5, is provided with a plurality of alined apertures or openings 7, to afford a primary burner. Projecting through a suitable aperture in the end frame 4, and removably threaded into one end of the storage tank 5, is an arm 8, to the outer end of which is rigidly secured an inclined pipe or auxiliary burner 9, provided with a plurality of burner apertures 10, in the lower surface thereof.

Disposed longitudinally in front of the apertures 7, of the primary burner, and with the ends thereof projecting through and supported by the end frames 3 and 4, is a main or primary oil-gas generating tube or pipe 11, having a spiral spring or coil 12, disposed therein. Removably threaded into the end of the main generating pipe which projects through the end frame 3, is one end of an oil inlet union or connector 13, the other threaded end of which is adapted to be connected with an oil feed pipe (not shown) but which is connected with an oil supply pressure tank of any suitable type. Mounted longitudinally in front of the storage tank 5, and directly below the main generating pipe 11, is a main wick starting burner 14.

Removably threaded into the other end of the main generating pipe 11, is a stub connecting arm 15, which projects through a suitable opening provided for the purpose in the end frame 4, and has integrally formed or rigidly secured at right angles on the outer end thereof, an inclined auxiliary generating pipe 16, which is closed at its upper end and open at its lower end. The lower open end of the generating pipe 16, is closed by means of a stopper or plug 17, removably threaded into the open end of said generating pipe 16, to permit cleaning thereof. As clearly shown in Figs. 4 and 6, the inclined generating pipe 16, is disposed below the inclined auxiliary burner 9, and is parallel thereto to permit flames issuing from the apertures 10, to heat said inclined generating pipe 16, as hereinafter more fully described.

Integrally formed at right angles near the lower end of the inclined generating pipe, and parallel to and below the stub arm 15, is a nozzle pipe 18, having a passage 19, therein, which communicates with a passage 20, in said generating pipe 16, and terminates in an enlarged passage to afford a seat 21, in said nozzle pipe. Adjustably threaded into the enlarged portion of the passage 19, of the nozzle pipe, is a threaded shank or screw 22, having integrally formed on one end thereof a valve rod 23, of reduced diameter affording an inclined or tapered portion between said shank and valve rod adapted to engage against the seat 21. The valve rod 23, projects longitudinally through the passage 19, and has its outer end tapered, as denoted by the numeral 24, to permit the same to seat or project into a tapered oil-gas outlet passage formed in a valve plug 25, which is removably threaded into one end of the nozzle pipe 18, thereby affording a suitable oil-gas outlet nozzle or jet which is positioned with the end thereof axially alined and opposite to the opening in the end of the carbureting pipe 6, as shown in Figs. 3 and 13. The other end of the nozzle pipe 18, is provided with an enlarged chamber in which is seated a suitable packing 26, disposed around a valve stem 27, integrally formed on the other end of the shank 22. Said valve stem 27, projects outwardly through a nut cap 28, removably threaded upon the outer end of the nozzle pipe 18, for holding the packing in position. The outer end of the valve stem 27, is of rectangular cross-section to afford a means for readily adjusting the oil-gas inlet valve mechanism. Securely mounted upon the outer surface of the end frame 4, and below the auxiliary generating pipe 16, is an auxiliary or secondary wick starting burner comprising a cup or trough 29, having a wick 30, therein.

Integrally formed centrally upon the top wall of the storage tank 5, is a socket 31, having an opening 32, therein. A secondary burner is removably secured in the socket 31, and embraces a stand or feed pipe 33, the lower end of which is adapted to rotatably and removably fit into the socket over the opening 32, therein. Formed integrally on the upper end of the feed pipe 33, is a bottom or base plate 34, having an opening in the center thereof, and a peripheral notch or groove therein to permit a burner casing 35, to seat upon said base plate. Pivotally mounted upon the base plate 34, to form a valve, is a shutter or a regulating or controlling disk 36, provided with a handle 37, which extends outwardly through a suitable slot provided in the burner casing, to afford a means for swinging the disk 36, to regulate the flow of oil-gas from the storage tank 5, into the burner casing. As clearly shown in Fig. 8, the top of the burner casing 35, is provided with a plurality of gas apertures or openings 38.

Secured upon the top wall of the storage tank 5, are supports or brackets 39, upon which are mounted a liquid container or water heater embracing a lower cylindrical hollow casing, hood or tank 40, having one end of an inlet pipe 41, connected therewith, the other end of said inlet pipe 41, being connected with the lowermost tube of the radiator 2, or with any other suitable type of device into which heated water is to be passed. Integrally formed centrally upon the top of the casing 40, is a neck or collar 41ª, on the upper end of which is integrally formed an inverted cup-shaped chambered inner casing or hood 42, of a diameter greater than that of the casing 40, to permit the inner hood to extend around the upper portion of the casing 40. Projecting through the horizontal portion of the inner hood 42, are a plurality of vertical tubes 43, which connect the space below the hood with that above the hood. Threaded into an opening formed in the upper central portion of the top wall of the inner hood 42, is the lower end of a pipe connector or sleeve 44, upon the upper end of which is threaded an upper or outer inverted cup-shaped casing or hood 45, of a diameter greater than that of the inner hood, to permit the upper hood to surround the inner hood 42. Threaded in an opening in the center of the top wall of the large upper hood 45, is the lower end of an outlet pipe or tube 46, the upper end of which is connected with the uppermost tube of the radiator 2, or to any other suitable type of radiator, boiler or hot water reservoir. As clearly shown in Figs. 2 and 3, the water container or hoods are disposed above the secondary or stove burner. It will, of course, be understood that any number of connected hoods may be provided to permit a liquid to be heated to circulate therethrough.

The operation is as follows:

As shown in Fig. 1, the hydro-carbon heating unit is connected with a looped radiator 2. To start the heating unit, kerosene or any other suitable hydro-carbon fuel is supplied from a pressure supply tank through the connector 13, into the primary generating pipe 11. The wicks of the primary or main starting burner 14, and of the secondary starting burner 29, are saturated with kerosene or alcohol and lighted, the heat resulting from the burning wicks tending to rapidly heat the primary generating pipe 11, and the spring 12, therein, and the inclined pipe 16, thus causing a primary volatilization of the oil within said generating pipes 11 and 16, to form an oil-gas, which passes through the inclined generating pipe 16, into the passage 19, of the nozzle, the end of which is disposed opposite the air intake or open end of the carbureting pipe 6. By turning the valve stem 27, the tapered end 24, of the valve rod 23, is unseated, thus permitting the generated oil-gas to pass through the restricted outlet passage into the carbureting pipe 6, to be mixed with air which is drawn into the open end of said carbureting pipe. The carbureted air forms a suitable fuel gas which passes upwardly into the storage tank 5, the shutter 36, being in closed position to prevent escape of the oil-gas into the secondary or stove burner.

The generated oil-gas in the tank 5, passes outwardly through the apertures 7, forming the primary burner, and also passes into the inclined auxiliary burner 9, and out through the burning apertures 10, thereof. The oil-gas escaping through the apertures 7 and 10, is ignited, the resulting flames from said apertures striking or passing around the respective primary generating pipe 11, and around the secondary generating pipe 16, and the oil-gas nozzle mechanisms, thereby volatilizing the kerosene oil passing into the main generating pipe 11, and the inclined generating pipe 16, to generate more gas by the burning of the oil-gas already generated by the starting burners 14 and 29, thus permitting the process of oil-gas generation to continue, after being started by the starting burners which, of course, go out after the alcohol or kerosene with which the wicks were saturated has burned up.

After the starting of the device as described, the shutter 36, is moved to open position by the handle 37, permitting the oil-gas from the storage tank 5, to flow upwardly into the burner casing 35, and out through the openings 38. The escaping oil-gas is lighted, the flames passing upwardly striking against the bottom and around the water tank 40, and into the open spaces afforded between the tank 40, and the inner hood 42, and between the inner and outer hoods 42 and 45. The flames passing into the space below the inner hood 42, of course, pass upwardly through the short tubes 43, into the space above said hood. This arrangement affords a large heating surface for the water container whereby the water within said container is rapidly heated, the heated water rising and passing upwardly through the outlet pipe 46, through the radiator tubes and back through the inlet pipe 41, into the heated water container. The heated water circulating through the radiator 2, heats the same, which in turn radiates its heat to heat the room wherein the radiator is installed.

Due to the novel arrangement of the oil-gas generating mechanisms the gas generated therein is heated during its entire passage through the generating pipes 11 and 16, and is not allowed to cool off before it is mixed with air in the carbureting pipe 6. This arrangement also prevents carbonization of the gas nozzle and gas tip, which are accordingly kept clean and free from clogging. If any foreign substances contained in the kerosene oil are deposited in the nozzle or in the secondary gas generating mechanisms, the respective plugs 25 and 17, may be removed to permit cleaning of the parts.

It will, of course, be understood that the chambered water container supported above the stove burner may have any desired number of communicating hoods or casings, the shapes of which may be varied to afford large heating surfaces.

I am aware that numerous details of construction may be varied through a wide range without departing from the principles of this invention, and I therefore do not purpose limiting the patent granted otherwise than necessitated by the prior art.

I claim as my invention:

1. A water heater for the purpose specified, comprising a hollow cylindric tank having an inlet, and a central outlet in its top; a collar surrounding the outlet; an inverted cup-shaped hollow hood of larger diameter than the tank and mounted upon the said collar and spaced thereby from the tank, the outer portion of said hood depending below and surrounding the upper part of said tank but spaced therefrom; an axially disposed sleeve communicating with and rising from the top of said hood; an inverted cup-shaped hollow casing of larger diameter than the hood arranged above the latter and supported on said sleeve, the outer portion of said casing depending below and surrounding the upper portion of said hood but spaced therefrom; said casing having a water outlet in its top, substantially as described.

2. A water heater for the purpose specified, comprising a hollow cylindric casting forming a tank and having an inlet in one side and a central outlet in its top; a tubular collar surrounding the outlet; an inverted cup-shaped hollow casting forming a hood of larger diameter than the tank and mounted upon the said collar and spaced thereby from the tank, the outer portion of said hood depending below and surrounding the upper part of said tank but spaced therefrom; an axially disposed sleeve communicating with and rising from the top of said hood; and an inverted cup-shaped hollow casting forming a casing of larger diameter than the hood arranged above the latter and supported on said sleeve, the outer portion of said casing depending below and surrounding the upper portion of said hood but spaced therefrom; said casing having a water outlet in its top, substantially as described.

3. A water heater for the purpose specified, comprising a hollow cylindric tank having an inlet in one side and a central outlet in its top; a tubular collar rising from said outlet; an inverted cup-shaped hollow hood of larger diameter than the tank and mounted upon the said collar and spaced thereby from the tank, the outer portion of said hood depending below and surrounding the upper part of said tank but spaced therefrom, said hood being provided with a plurality of vertically disposed tubes extending therethrough and forming flues for the passage of hot gases; an axially disposed sleeve communicating with and rising from the upper side of said hood; and an inverted cup-shaped hollow casing of larger diameter than the hood and arranged above the latter and supported on said sleeve, the outer portion of said casing depending below and surrounding the upper portion of said hood but spaced therefrom; said casing having a water outlet in its top, all substantially as described.

4. A water heater for the purpose specified, comprising a hollow cylindric casting forming a tank having an inlet in one side and a central outlet opening in its top; a tubular collar rising from said opening; an inverted cup-shaped hollow casting forming a hood of larger diameter than the tank and mounted upon the said collar and spaced thereby from the tank, the outer portion of said hood depending below and surrounding the upper part of said tank but spaced therefrom, said hood being provided with a plurality of vertically disposed tubes extending therethrough and forming flues for the passage of hot gases; an axially disposed sleeve rising from the upper side of said hood; and an inverted cup-shaped hollow casting forming an outer casing of larger diameter than the hood and arranged above the latter and supported on said sleeve, the outer portion of said casing depending below and surrounding the upper portion of said hood but spaced therefrom; said casing having a water outlet in its top, all substantially as described.

In testimony whereof I have hereunto subscribed my name in the presence of two subscribing witnesses.

AUGUST A. RUSTEBERG.

Witnesses:
CHARLES W. HILLS, Jr.,
FRED E. PAESLER.